July 24, 1962   M. SKOBEL   3,045,281
PROCESS AND APPARATUS FOR MAKING SUPPORTED SLEEVING
Filed Nov. 25, 1958   2 Sheets-Sheet 1
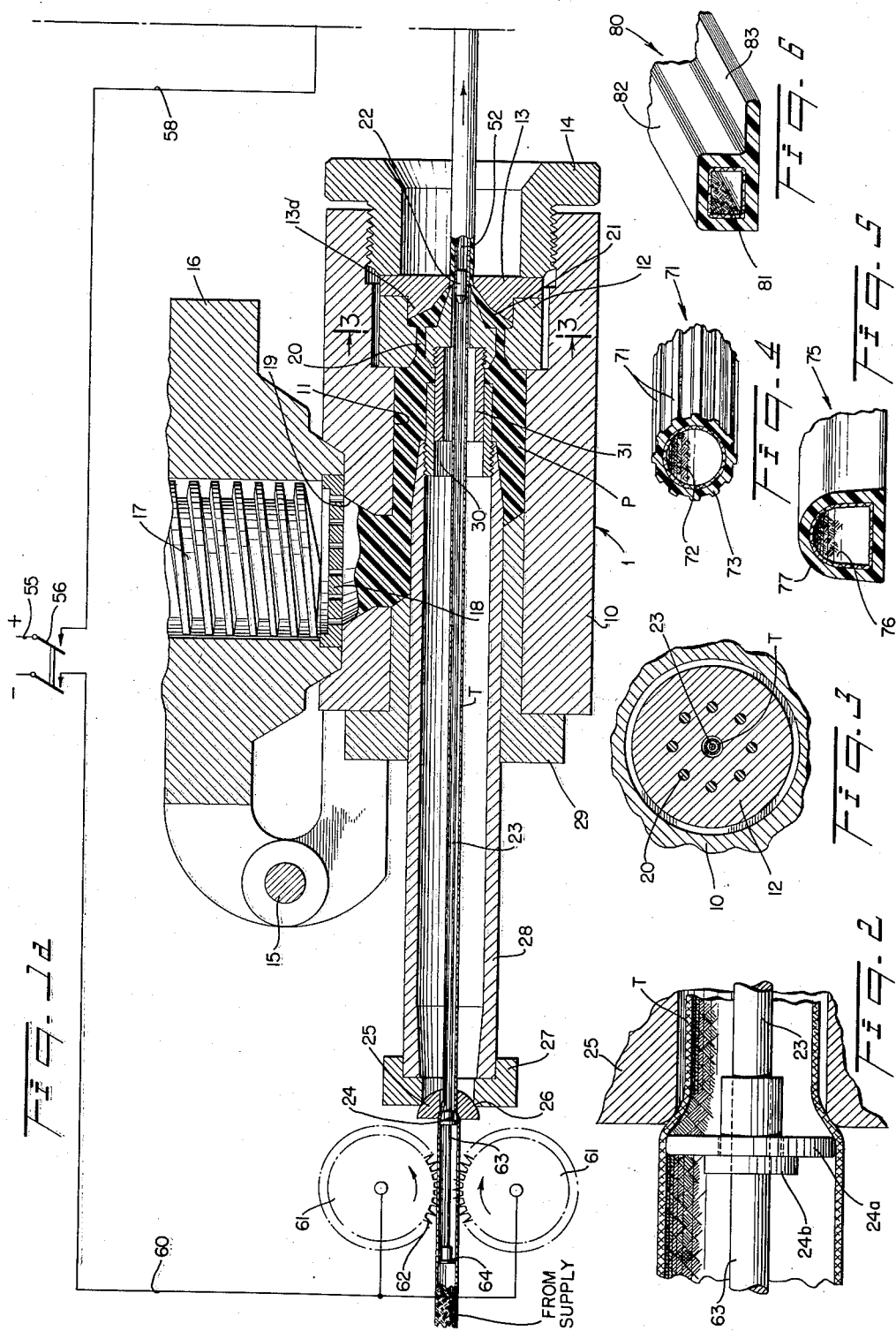

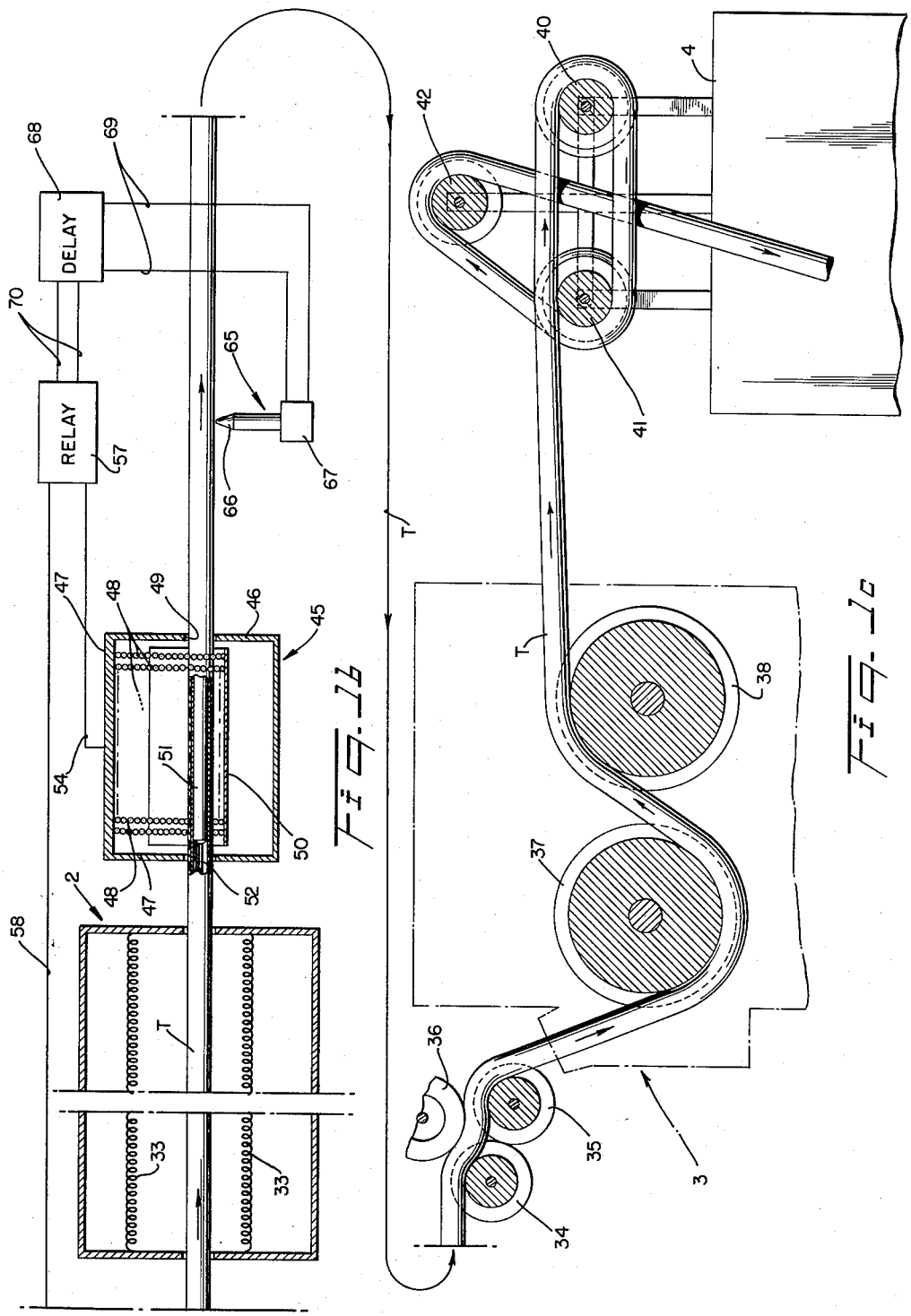

United States Patent Office 3,045,281
Patented July 24, 1962

3,045,281
PROCESS AND APPARATUS FOR MAKING
SUPPORTED SLEEVING
Max Skobel, 233 Pinewood Ave., Elberon, N.J.
Filed Nov. 25, 1958, Ser. No. 776,379
2 Claims. (Cl. 18—13)

The present invention relates to producing continuous flexible tubing or sleeves and particularly to a process and apparatus for applying a covering or coating of plastic material to an inner tube or sleeeve which is so flexible and supple as to be not self supporting. The inner tube may, for example be a braided, knitted or woven tube formed of mineral, animal, vegetable or synthetic fiber. The covering is of plastic material, the term plastic being herein used in a generic sense to include natural and synthetic resins, polymers, elastomers and other materials which are capable of being extruded in a plastic condition and thereafter are cured or set to provide an inert flexible and durable material.

According to present practice, plastic coatings are applied to fabric tubes by a dipping process in which the tube is run through a bath. This process has the disadvantage that the bath of plastic material contains a large proportion of solvents or other liquids which must be removed in the curing process and tend to produce a porosity in the coating. The thickness of the coating is limited to the amount that will adhere to the tubing as it comes out of the bath. If a thicker covering is desired a plurality of successive dipping operations is required. Moreover, it is not possible to control satisfactorily the cross sectional shape of the finished tube or the thickness and uniformity of the tube wall.

In accordance with the invention a plastic covering is applied to a supple inner tube by extrusion. The invention is particularly applicable to covering a fabric tube with synthetic rubber, for example silicone rubber, or with a plastic material for example polyethylene, Teflon or nylon. The fabric tube is preferably braided but may, if desired, by knitted, woven or felted of mineral fiber such as glass or asbestos, animal fiber such as silk or wool, vegetable fiber such as cotton or ramie or synthetic fiber such as nylon and rayon. As the inner tube is not sufficiently self supporting to withstand the pressure of the plastic material being extruded onto it, a feature of the invention is that the tube is supported internally at the zone where extrusion is effected.

A further feature of the invention is that it provides for continuously testing the completed tube electrically by means of an electrode inside the tube and another electrode outside the tube. A novel feature of the apparatus in accordance with the invention is that it provides for holding the inner electrode in place and also provides means for internally supporting the tube internally during extrusion despite the continuity of the tube. The process and method in accordance with the invention make it possible to produce reinforced or "supported" tubing or sleeving rapidly and economically. Such sleeving is particularly suitable for use as an electrical conduit by reason of its uniform wall thickness and constant electrical properties.

The nature, characteristics and advantages of the invention will be more fully understood from the following description and claims and from the accompanying drawings in which:

FIGS. 1a, 1b and 1c are together a schematic view partially in vertical section and partially in side elevation illustrating the process in with the invention and apparatus for carrying out the process.

FIG. 2 is an enlarged view corresponding to a portion of FIG. 1a, but showing a modification.

FIG. 3 is a cross section taken approximately on the line 3—3 in FIG. 1a.

FIGS. 4, 5 and 6 are cross sectional perspective views of supported tubes in accordance with the invention.

In carrying out the process of making a reinforced or "supported" tube in accordance with the invention a fabric tube T is formed by any suitable process for example by weaving, knitting or braiding. A braided tube is shown by way of example in the drawings. As the tube is formed it is wound up on a suitable supply reel. From the supply reel the tube T is drawn through an extruder 1 and a curing chamber 2 by a capstan 3. As the tube T passes through the extruder 1, a layer or coating or plastic P is extruded onto the tube. The plastic covering is cured or set in the chamber 2. From the capstan 3 the tube passes to a takeup mechanism 4 and from there to a reel.

The extruder 1 comprises an extruder cross head 10 having a stepped axial bore 11 in which there is mounted an extruding die assembly comprising a guider 12 and a die 13, both of which are held in place by a threaded collar or nut 14. The guider 12 and die 13 are provided with aligned axial holes through which the tube T passes, the hole in the guider 12 being approximately the same size as the fabric tube before coating and the aligned hole in the die 12 being larger by an amount corresponding to the thickness of the desired coating. As described more fully in my copending application, Serial No. 776,378 filed simultaneously herewith, the die 13 has an inwardly projecting portion 13a which fits closely into a recess in the guider 12 to center the die accurately with respect to the guider. The axial holes in the guider 12 and die 13 are thereby accurately aligned.

The extruder cross head 10 is hinged at 15 to a cylinder 16 and is held tightly against the lower head of the cylinder by suitable fastening means, for example bolts (not shown). The cylinder 16 contains a feeding screw 17 which is rotated to force plastic material downwardly under high pressure, for example 3000 pounds per square inch, through a breaker plate 18 and radial passage 19 into the axial bore 11 of the extruder cross heads 10. From the bore 11 the plastic flows through a plurality of circumferentially spaced axially extending holes 20 in the guider 12 to an annular tapered space 21 formed between the guider 12 and the die 13 and leading into the die opening. The plastic is thus extruded onto the tube T as it is drawn through the extruder cross head.

In order to keep the tube T from being collapsed from the pressure of the plastic P being extruded onto it, there is provided inside the tube an inner die or pin 22 which has a diameter corresponding to the internal diameter of the tube. The inner die 22 is preferably cylindrical and supports the tube T internally in the zone where the plastic P is extruded onto the tube. As illustrated in FIG. 1a the forward portion of the inner die 22 extends into the axial hole of the guider 12 while the opposite end extends a short distance beyond the outer face of the die 13. As the diameter of the inner die 22 is less than the diameter of the hole in the guider 12 by an amount substantially equal to twice the thickness of the tube wall, the guider 12 holds the inner die 22 in accurately centered relation to the outer die 13.

The inner die 22 has an elongated stem portion 23 that extends in a direction opposite to the direction of movement of the tube T. At a point in advance of the extruder head 10, the stem 23 is provided with a shoulder or head portion 24 which has a diameter approximately equal to or slightly greater than the normal internal diameter of the fabric tube T. An annular abutment member 25 just behind the head 24 has a central hole which is slightly smaller in diameter than the head. The forward face of the abutment member 25 is flat and meets the central hole in a substantially square edge which is rounded sufficiently to avoid being sharp. The rear face of the abutment member 25 is spherical and seats in a spherical socket 26 of a cap member 27 on the end of sleeve 28 which extends forwardly from the extruder cross head and surrounds the tube T. The rear end portion of the sleeve 28 extends through a bushing 29 into the extruder cross head and is screwed onto a short sleeve 30 which has a sliding fit with another short sleeve 31 screwed into the guider 12. When it is desired to clean the extruder head, for example at the end of the run, the die 13, guider 12 and attached sleeve 31 are removed from the extruder cross head by unscrewing the nut 14.

As the tube T is drawn through the extruder cross head on the stem portion 23 of the inner die 22 through the central hole of the abutment member 25, the tube expands slightly if necessary to pass over the head 24 and then contracts to pass through the central hole of the abutment 25, the contraction being implemented by the pull of the capstan 3 (FIG. 1c). It has been found that the tube passes freely over the head 24 and through the hole in the abutment 25 without binding or objectionable resistance. As the hole in the abutment member 25 is smaller than the head 24, the inner die member 22 is held against such pull as may result from frictional engagement of the tube with the inner die member. The arrangement shown thus maintains the inner die member in correct position. The ball-and-socket mounting of the abutment member 25 assures proper alignment and uniform distribution of forces acting through the tube wall to maintain the head 24 and hence the inner die member 22 in position.

FIG. 2 shows on an enlarged scale a preferred embodiment in which the head on the stem 23, instead of being integral as illustrated in FIG. 1a, comprises a removable washer 24a seating on a shoulder or abutment 24b. The rear face of the washer is flat with the outer corner edges rounded sufficiently to avoid sharpness. The outer diameter of the washer is slightly greater than the diameter of the opening in the abutment member 25 so that the flat face of the washer 24a overlaps slightly the flat face of the abutment member 25. The washer 24a is formed of hard material to reduce wear and is readily replaceable. All surfaces engaged by the fabric tube T are smooth and polished to reduce friction.

From the extruding head 10 the tube T—with an extruded coating of plastic on it—passes through the curing chamber 2 which is illustrated schematically in the drawing (FIG. 1b) as an oven having electrical heating elements 33. The curing chamber 2 is of sufficient length to provide for the curing of the plastic covering on the tube during passage of the tube through the chamber.

The tube T is drawn through the extruder 1 and the curing chamber 2 by a capstan 3 which is illustrated schematically as comprising guide pulleys 34, 35 and 36 and traction pulleys 37 and 38, one or both of which are driven, preferably by a variable speed motor or through a variable speed drive. From the capstan 3 the tube passes to a take-up mechanism 4 which is illustrated schematically as comprising guide pulleys 40, 41 and 42 and a take-up reel (not shown).

In a preferred embodiment, the process and apparatus in accordance with the invention further provide for continuously testing the dielectric strength of the tube wall. As illustrated schematically in the drawing, the testing is effected by a spark tester 45 comprising a box or casing 46 having a removable cover 47 from which are suspended a multiplicity of bead chains 48, at least the cover and bead chains being formed of electrical conducting material. The tube T after being curved in the curing chamber 2 passes through the testing unit, holes 49 being provided in the opposite ends of the casing 46 for that purpose. The bead chains 48 drape themselves over the tube as it passes through the testing unit. A trough 50 which is V-shaped in cross section causes the chains 48 to converge beneath the tube so that substantially all portions of the tube are engaged by one or more of the bead chains. An inner electrode 51 is connected by a link, chain or wire 52 to the inner die member 22. The connecting link 52 extends inside the tube and is electrically conductive so that the inner electrode 50 is connected to the inner die 22 both mechanically and electrically.

An electrical test circuit shown schematically as comprising a variable voltage source 55 controlled by a switch 56, a relay 57 and a connecting conductor 58 has one lead 59 connected to the outer electrode of the testing unit comprising the cover 47 and depending bead chains 48. Another lead 60 is electrically connected to the inner electrode 51 by means of one or more rotating wheels 61, each having on its periphery a multiplicity of sharp points 62 which penetrate the wall of the fabric tube T and contact or substantially contact an extended shank portion 63 which is preferably integral with the stem portion 23 of the inner die member and extends forwardly from the head 24. A head 64 is preferably provided on the forward end of the shank portion 63. By having two wheels 61 on opposite sides of the shank 63 the forces acting on the shank are substantially balanced. The stem portion 23, inner die 22 and connecting link 52 provide an electrical connection between the shank portion 63 and the inner electrode 51.

With the arrangement shown, a voltage of selected value is applied to the wall of the tube T as it passes between the inner electrode 51 and the outer electrode comprising bead chains 48. If there is any weak spot in the tube wall, a resulting flow of current produces a signal which actuates the relay 57. The signal is used as desired, for example to produce an audible or visual indication. For example as illustrated in FIG. 1b, the signal of the spark tester is utilized to actuate a marking device 65 which may, for example comprise a nozzle 66 connected to a suitable source of compressed air and paint or other marking material, the nozzle being controlled by an electrically operated valve 67. The valve 67 is connected to and controlled by the test circuit. In order to take into account the time required for passage of a particular point on the tube from the spark tester 45 to the marking device 65 there is preferably provided a delay circuit or device 68 in the connections 69, 70 between the marking device and the relay 57 of the testing circuit. Any defective portion of the tube is thereby automatically marked as it passes the marking unit 65. The voltage applied between the inner and outer electrodes of the testing may be alternating, pulsating or direct current as desired.

The process and apparatus in accordance with the present invention make it possible to produce supported tubing or sleeving at a high rate of speed for example 5 to 200 feet per minute. Uniform thickness of the tube wall throughout its circumference and length is assured by the accurate centering of the inner and outer die members. The quality of the product is further assured by the testing device which automatically marks any defective portion.

The supported sleeve or tubing in accordance with the present invention represents an important improvement over tubing heretofore available, for example that produced by a dipping method as described above. By reason of its being applied under pressure, the rubber coating is integrated with the fabric tube and is dense, uniform and free of pin holes such as those that frequently result from the evaporation of solvents from a coating applied by dipping. Moreover, it is possible by extrusion to utilize certain silicone rubbers and other plastics that cannot satisfactorily be thinned sufficiently to be used in a dipping process without impairing their strength, durability, electrical insulating properties or other characteristics. The present invention also makes it possible to produce supported tubing having cross sectional shapes not heretofore obtainable. A few such shapes are illustrated by way of example in FIGS. 4, 5 and 6.

FIG. 4 shows tubing 71 comprising a fabric tube 72 and a covering 73 formed of plastic material. The inner surface of the tubing is substantially cylindrical while the outer surface is fluted with a plurality of longitudinally extending ribs or ridges 74 separated by intervening valleys.

In FIG. 5 there is shown tubing 75 which is substantially D-shaped in cross section and comprises a fabric tube 76 and an outer covering 77 of plastic material.

FIG. 6 shows tubing 80 comprising a fabric inner tube 81 and a plastic covering 82. The fabric tube 81 is essentially D-shaped in cross section while the cross section of the plastic portion 82 is substantially P-shaped with a flange or stem portion 83.

The cross sectional shape and wall thickness of the supported tubing in accordance with the invention can be selected as desired by the selection of corresponding cross sectional shape of the inner die member and the extruding opening in the outer die member. As illustrated particularly in FIGS. 4 and 5 cross sectional shape of the fabric tube portion and the outside cross sectional shape of the plastic portion need not be the same. In each instance, the inner die member is accurately positioned by the guider in selected relation to the opening in the outer die member so as to obtain either a uniform wall thickness throughout the circumferential extent of the tube or a wall having selected portions thicker than others as desired. In contrast with tubing produced by the dipping process referred to above, which can have only an approximate and uncontrolled circular cross section, the tubing in accordance with the present invention may have an unlimited variety of non-circular cross sectional shapes.

While preferred embodiments of the invention have been shown and described in the application, it will be understood that the invention is in no way limited to these particular embodiments and that modifications may be made within the scope of the appended claims.

What I claim and desire to secure by Letters Patent is:

1. Apparatus for applying to a supple tube a covering of plastic material, the length of the coated tubing being unlimited by the apparatus which comprises an extruding die having a die aperture, means for drawing said tube through said aperture means for feeding plastic material in a plastic condition to said extruding die to be extruded on said tube as it is drawn through said die aperture, an inner die member supporting said tube internally inside said aperture, said tube passing between said inner die member and said die, said inner die member having a stem extending forwardly inside said tube in a direction opposite the direction of travel of said tube and a head, over which said tubing is expanded on said stem in advance of said die, an inner electrode disposed inside said tube between said die and said drawing means, connecting means electrically and mechanically connecting said inner electrode and inner die member, an outer electrode surrounding and in contrast with the outer surface of said tube, a voltage supply having terminals, circuit means electrically connecting one terminal with said inner die member and inner electrode and another terminal with said outer electrode to apply a voltage across the wall of said coated tube and means detecting the flow of current between said electrodes and a curing chamber interposed between said die and said electrodes, said coated tube passing through said chamber and said plastic material being thereby at least partially cured in advance of said electrodes.

2. Apparatus according to claim 1, in which said inner die member extends forwardly to provide a shank portion in advance of said head, and in which said circuit means includes a rotating element having on its periphery a plurality of points, said element being associated with said shank and rotatable about an axis transverse to said stem with said points penetrating said tube as said tube moves over said shank, said apparatus further including means for marking the tube in response to the flow of current in the event it reaches a selected value.

References Cited in the file of this patent
UNITED STATES PATENTS

| | | |
|---|---|---|
| 1,499,533 | Katzenmeyer | July 1, 1924 |
| 2,456,704 | Henning | Dec. 21, 1948 |
| 2,602,959 | Felin | July 15, 1952 |
| 2,635,136 | Duffy | Apr. 14, 1953 |
| 2,814,071 | Allan et al. | Nov. 26, 1957 |
| 2,820,987 | Bunch | Jan. 28, 1958 |
| 2,874,411 | Berquist | Feb. 24, 1959 |